Patented June 17, 1924.

1,498,021

UNITED STATES PATENT OFFICE.

HARRY D. EDWARDS, OF LARCHMONT, NEW YORK, ASSIGNOR TO CARBIDE & CARBON CHEMICALS CORPORATION, A CORPORATION OF NEW YORK.

LUBRICANT FOR REFRIGERATING MACHINES.

No Drawing. Application filed August 26, 1922. Serial No. 584,557.

*To all whom it may concern:*

Be it known that I, HARRY D. EDWARDS, a citizen of the United States, residing at Larchmont, in the county of Westchester and State of New York, have invented certain new and useful Improvements in Lubricants for Refrigerating Machines, of which the following is a specification.

Oils such as are ordinarily used for lubrication have the property of dissolving many substances employed in refrigerating cycles, for example ethane, propane, butane, methyl chlorid and ethyl chlorid, and this solubility is increased by the pressure to which the refrigerant is subjected in the compressor of a refrigerating system. By taking up a substance of the kind mentioned, the oil becomes diluted and thinned, and loses its lubricating properties. This is especially undesirable in the operation of small household installations, where there is a minimum of skilled attendance, and where a supply of lubricant must serve for a long period without replacement.

To avoid the above mentioned difficulty, it has been proposed to use glycerine as a lubricant, as the ordinary refrigerants are substantially insoluble in this liquid. Glycerine, however, has the disadvantage of too high viscosity at the low temperatures encountered in refrigerating machines, so that it is extremely difficult to cause it to reach all portions of the wearing surfaces.

The object of the present invention is to provide a lubricant for refrigerating machines which will be free from the above mentioned defects.

Other substances which, like glycerine, contain a plurality of hydroxy groups in the molecule, are similar to glycerine in that they do not dissolve refrigerants of the kind described. The glycols, for example trimethylene glycol, propylene glycol and ethylene glycol, are examples of this class of substances. At low temperatures the viscosities of the glycols are less than that of glycerine, and they are therefore able to lubricate effectively at temperatures at which glycerine is not sufficiently fluid to cover the wearing surfaces properly.

Ethylene glycol is the most fluid of the glycols and is therefore preferred as a lubricant under conditions of very low temperature. At temperatures which are higher though still subnormal, its viscosity may become insufficient for the most effective lubrication, and for refrigerating machines in general where exceedingly low temperatures are not encountered, propylene glycol is best adapted for use because of its somewhat higher viscosity. A lubricant of any desired viscosity within a wide range may be prepared by mixing together, in suitable proportions, two or more glycols with or without glycerine.

The lubricating properties of the glycols or of any of the mixtures referred to above, are enhanced by the addition thereto of a small percentage of graphite, either in flake or deflocculated form. As glycols and glycerine are miscible with water, deflocculated graphite may be readily introduced by mixing the hydroxy compound with a suitable proportion of an aqueous colloidal suspension of graphite and then evaporating the water or a portion of it.

Having described my invention, what I claim is:

1. A lubricant for refrigerating machines containing a glycol.

2. A lubricant for refrigerating machines containing a glycol and graphite.

3. A lubricant for refrigerating machines containing propylene glycol.

4. A lubricant for refrigerating machines containing propylene glycol and graphite.

5. A lubricant for refrigerating machines containing a glycol and glycerine.

6. A lubricant for refrigerating machines containing a glycol, glycerine and graphite.

In testimony whereof I affix my signature.

HARRY D. EDWARDS.